United States Patent
Calvet

(10) Patent No.: US 7,359,130 B1
(45) Date of Patent: Apr. 15, 2008

(54) LENS MOUNT AND ALIGNMENT METHOD

(75) Inventor: Robert J. Calvet, Pasadena, CA (US)

(73) Assignee: Siimpel Corporation, Arcadia, CA (US)

( * ) Notice: Subject to any disclaimer, the term of this patent is extended or adjusted under 35 U.S.C. 154(b) by 0 days.

(21) Appl. No.: 11/364,100

(22) Filed: Feb. 28, 2006

Related U.S. Application Data

(63) Continuation-in-part of application No. 11/361,608, filed on Feb. 24, 2006, and a continuation-in-part of application No. 11/041,122, filed on Jan. 21, 2005, now Pat. No. 7,266,272, which is a continuation-in-part of application No. 10/067,466, filed on Feb. 4, 2002, now Pat. No. 6,850,675.

(60) Provisional application No. 60/657,261, filed on Feb. 28, 2005.

(51) Int. Cl.
*G02B 7/02* (2006.01)
*G03B 13/20* (2006.01)
*G03B 15/03* (2006.01)
*G03B 21/14* (2006.01)

(52) U.S. Cl. ............. 359/819; 359/811; 359/822; 359/823; 396/141; 396/197; 396/323; 353/100; 353/101

(58) Field of Classification Search ......... 359/808, 359/811, 818–820, 822, 823; 396/141, 197, 396/323; 353/100, 101; 235/462.21, 462.2, 235/462.24; 348/E5.027; 352/46, 85; 29/407.1, 29/709
See application file for complete search history.

(56) References Cited

U.S. PATENT DOCUMENTS

| | | | | |
|---|---|---|---|---|
| 4,100,555 A | * | 7/1978 | Johnson | 396/141 |
| 4,140,381 A | * | 2/1979 | Douglas | 396/323 |
| 4,331,396 A | * | 5/1982 | Nyman | 352/85 |
| 5,005,948 A | * | 4/1991 | Takahashi et al. | 359/819 |
| 5,249,082 A | * | 9/1993 | Newman | 359/813 |
| 5,537,262 A | * | 7/1996 | Aoki et al. | 359/822 |
| 5,618,094 A | * | 4/1997 | Lee | 353/101 |
| 6,400,516 B1 | * | 6/2002 | Spinali | 359/819 |
| 6,547,402 B2 | * | 4/2003 | Masuda | 353/101 |
| 6,755,540 B1 | * | 6/2004 | Runco | 353/101 |
| 6,832,725 B2 | * | 12/2004 | Gardiner et al. | 235/462.21 |
| 6,867,812 B2 | * | 3/2005 | Iiizumi et al. | 348/374 |
| 7,154,684 B2 | * | 12/2006 | Shibazaki | 359/811 |

* cited by examiner

*Primary Examiner*—Loha Ben
(74) *Attorney, Agent, or Firm*—MacPherson Kwok Chen & Heid LLP; Brent A. Folsom

(57) ABSTRACT

An improved lens mount and related alignment methods are provided. In one example, a lens mount includes a ring member and a base member connected with the ring member. The base member has a bottom surface. First and second coplanar mounting pads are provided on the bottom surface of the base member. In another example, a method of aligning a lens mount relative to a stage includes providing a lens mount comprising: a ring member and a base member connected with the ring member. A stage having a top surface is provided. A plurality of alignment members on a bottom surface of the base member are aligned with a corresponding plurality of apertures in the stage. The alignment members are inserted into the apertures, and first, second, and third mounting pads on the bottom surface of the base member are contacted with the top surface of the stage.

29 Claims, 8 Drawing Sheets

LENS MOUNT AND ALIGNMENT METHOD

CROSS-REFERENCE TO RELATED APPLICATIONS

This application is a continuation-in-part application of U.S. patent application Ser. No. 11/041,122 filed on Jan. 21, 2005 now U.S. Pat. No. 7,266,272 entitled "Motion Control Stages and Method of Making the Same", which is a continuation-in-part of U.S. patent application Ser. No. 10/067,466 entitled "Base, Payload and Connecting Stricture and Methods of Making the Same" filed on Feb. 4, 2002, now U.S. Pat. No. 6,850,675, issued on Feb. 1, 2005, all of which are incorporated herein by reference.

In addition, this application claims the benefit of U.S. Provisional Patent Application No. 60/657,261 filed on Feb. 28, 2005 entitled "Autofocus Camera", which is incorporated herein by reference.

In addition, this application is a continuation-in-part application of U.S. patent application Ser. No. 11/361,608 filed on Feb. 24, 2006 entitled "Autofocus Camera", which is incorporated herein by reference.

BACKGROUND

1. Field of the Invention

The present invention generally relates to optics and, more particularly, to lens mounts that are suitable for use with miniature cameras.

2. Related Art

Optical devices often use one or more lenses to obtain images. In order to provide satisfactory images, it is important that the lenses to be properly aligned with other optical components. For example, in digital cameras, one or more lenses may be used to focus images on an imager. Such lenses may be held in fixed positions or may be mounted in a manner that permits controlled movement of the lenses relative to the imager. However, if the lenses are not properly aligned with respect to the imager, then images captured by the imager may be distorted.

The accuracy of lens alignment becomes increasingly important as camera components become miniaturized. In particular, if lenses are misaligned along one or more rotational degrees of freedom, the corresponding pitch, yaw, or roll of the lenses relative to the imager may lead to unsatisfactory image quality.

Miniature fixed focus cameras may include lens mounts that are physically interfaced with a printed circuit board onto which an imager is also mounted. The printed circuit board may provide a mounting plane that is perpendicular to an optical axis of one or more lenses secured by the lens mount. As a result, the printed circuit board can form a reference to fix pitch and yaw of the lens mount.

Unfortunately, this prior approach to lens mount alignment is not well suited for more sophisticated miniature cameras. In particular, for cameras in which the lenses are moved in relation to the imager to provide focusing and/or zooming features, the lens mount may not always remain fixed in relation to a printed circuit board.

Accordingly, there is a need for an improved approach to lens mount design that overcomes the deficiencies in the prior art as discussed above. In particular, there is a need to provide an improved lens mount design that provides for reliable alignment of one or more lenses when employed in personal electronic devices such as miniature digital cameras.

SUMMARY

In accordance with one embodiment of the present invention, a lens mount includes: a ring member; a base member connected with the ring member, wherein the base member has a bottom surface; and first and second mounting pads on the bottom surface of the base member, wherein the first and second mounting pads are coplanar.

In accordance with another embodiment of the present invention, an apparatus adapted to position a lens includes: a lens mount comprising: a ring member, a base member connected with the ring member, wherein the base member has a bottom surface, first, second, and third mounting pads on the bottom surface of the base member, wherein the mounting pads are coplanar, and first and second alignment members on the first and second mounting pads; and a stage comprising: a top surface adapted to receive the first, second, and third mounting pads, and first and second apertures adapted to receive the alignment members.

In accordance with another embodiment of the present invention, a personal electronic device includes: a lens mount comprising: a ring member adapted to receive a lens barrel, a base member connected with the ring member, wherein the base member has a bottom surface, first, second, and third mounting pads on the bottom surface of the base member, wherein the mounting pads are coplanar, first and second alignment members on the first and second mounting pads, and first and second alignment surfaces on the first and second alignment members, respectively, wherein the first and second alignment surfaces are substantially perpendicular to the axis of the ring member; a stage comprising: a top surface adapted to receive the first, second, and third mounting pads, first and second apertures adapted to receive the alignment members, and first and second interior surfaces of the stage defining the first and second apertures, respectively, wherein the first and second interior surfaces are substantially parallel to the first and second alignment surfaces of the lens mount, respectively; and an actuator engaged with the stage and adapted to translate the stage in a plurality of directions.

In accordance with another embodiment of the present invention, a method of aligning a lens mount relative to a stage includes: providing a lens mount comprising: a ring member, and a base member connected with the ring member, wherein the base member has a bottom surface; providing a stage having a top surface; aligning a plurality of alignment members on a bottom surface of the base member with a corresponding plurality of apertures in the stage; inserting the alignment members into the apertures; and contacting first, second, and third mounting pads on the bottom surface of the base member with the top surface of the stage.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Like element numbers in different figures represent the same or similar elements.

DETAILED DESCRIPTION

Figure 1:
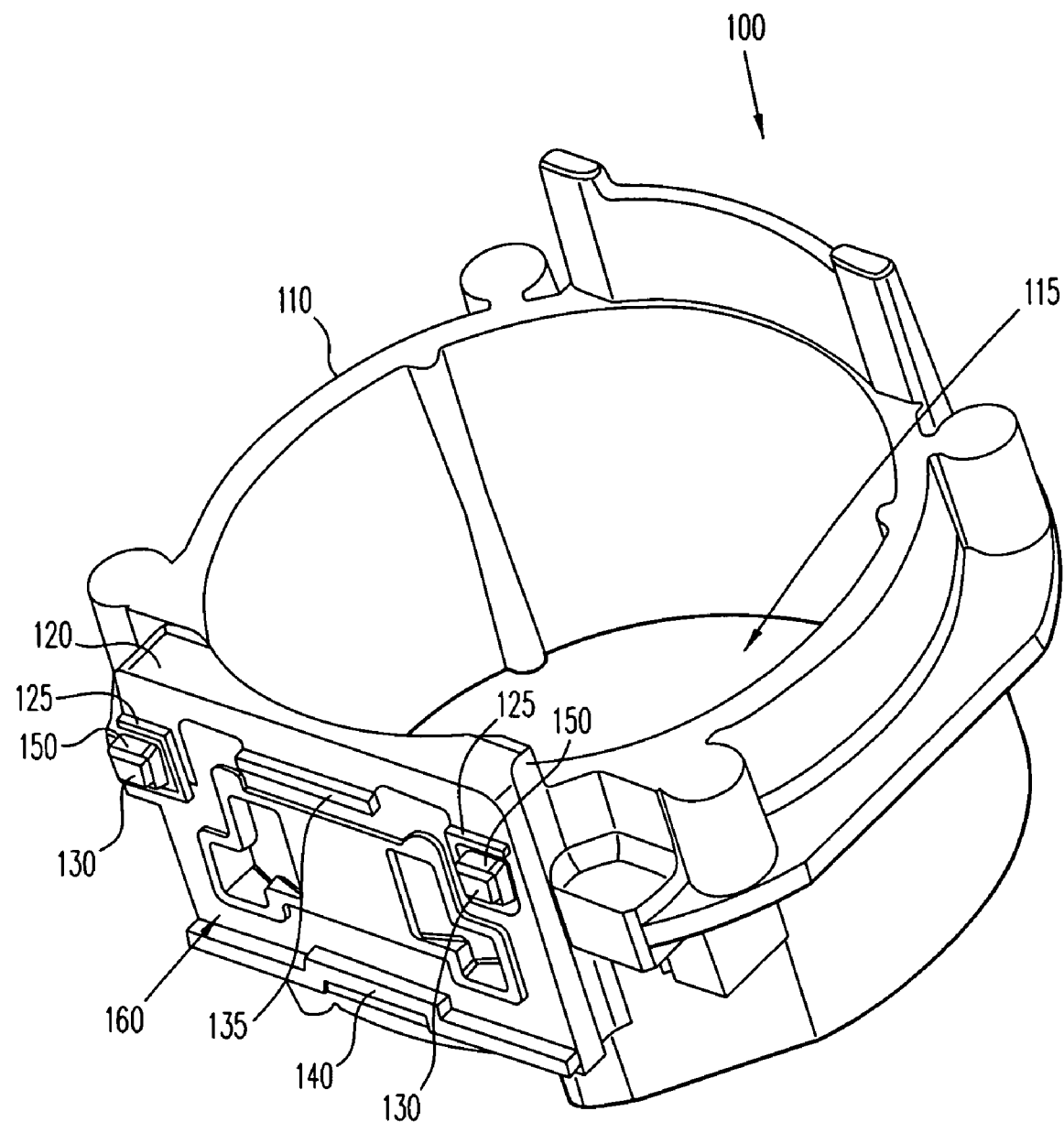
FIG. 1 illustrates a perspective view of a lens mount in accordance with an embodiment of the present invention.
Figure 2:
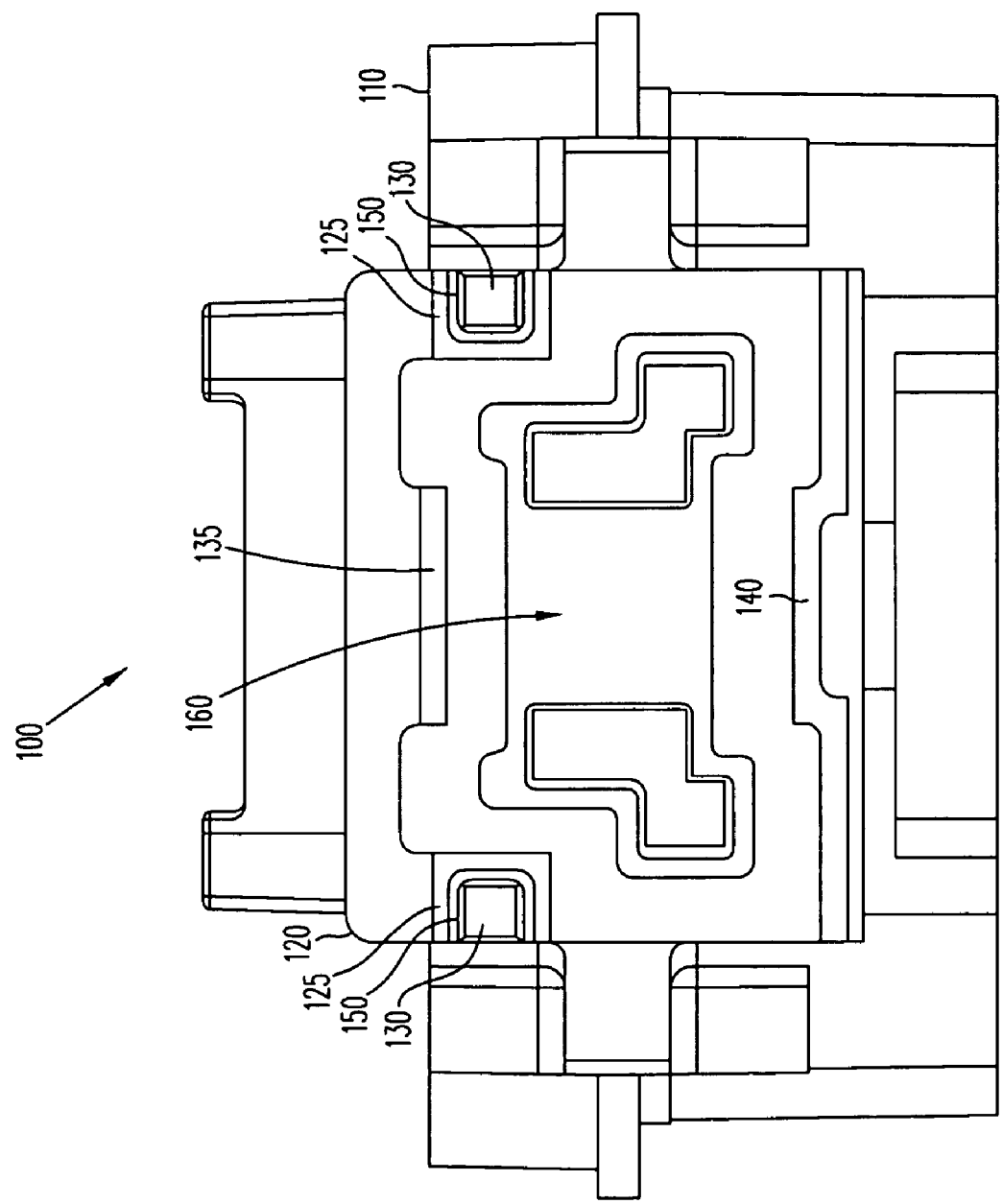
FIG. 2 illustrates a bottom view of a lens mount in accordance with an embodiment of the present invention.

Referring now to the drawings wherein the showings are for purposes of illustrating embodiments of the present invention only, and not for purposes of limiting the same, FIGS. 1 and 2 illustrate perspective and bottom views, respectively, of a lens mount 100 in accordance with an embodiment of the present invention. As further described herein, lens mount 100 can be used to mount one or more lenses relative to a stage. Individual lenses may be provided, or the lenses may reside in a lens barrel that is received by lens mount 100. Advantageously, lens mount 100 can be configured to be mounted on a stage such that three degrees of rotational freedom are resolved to high accuracy, namely pitch, yaw, and roll. Also advantageously, at least two translations can be resolved to high accuracy, namely along an optical axis of the one or more lenses mounted using lens mount 100 (i.e. the axis of a ring member 110 further described herein), and perpendicular to the plane provided by a stage (i.e. stage 200 further described herein).

As illustrated, lens mount 100 includes a ring member 110 connected with a base member 120. In various embodiments, ring member 110 and base member 120 can be a single unitary body or formed from separate components.

Ring member 110 defines a cylindrical interior portion 115 which is adapted to receive a lens, lens barrel, and/or other optical components to be mounted using lens mount 100. Threads (not shown) can also be provided on an interior surface of ring member 110 for securing a threaded lens barrel within cylindrical interior portion 115.

Base member 120 can be substantially rectangular in shape and is adapted to be mounted on a stage 200, as further described herein. In this regard, base member 120 includes a plurality of coplanar mounting pads adapted to contact stage 200. In particular, left and right mounting pads 125, front mounting pad 135, and rear mounting pad 140 are provided on a bottom surface 160 of base member 120.

As illustrated, left and right mounting pads 125 can be square in shape and situated in proximity to left and right sides, respectively, of bottom surface 160. Front mounting pad 135 may be implemented as a substantially elongate member situated at a front portion of bottom surface 160 in proximity to a front side of bottom surface 160. Rear mounting pad 140 may also be implemented as a substantially elongate member situated at a rear portion of bottom surface 160 in proximity to a rear side of bottom surface 160. It will be appreciated, however, that any of mounting pads 125, 135, and 140 may be implemented using other shapes and/or in other portions of bottom surface 160 as may be desired in particular applications. In various embodiments, greater or fewer numbers of mounting pads may be used.

Base member 120 further includes left and right alignment members 130 situated on left and right mounting pads 125. Alignment members 130 may be sized to be inserted into corresponding apertures in stage 200, as further described herein. In addition, substantially parallel alignment surfaces 150 are provided on front surfaces of alignment members 130 for further facilitating alignment of lens mount 100 relative to stage 200, as further described herein. In one embodiment, lens mount 100 and base member 120 are formed using a injection molding process.

Figure 3:
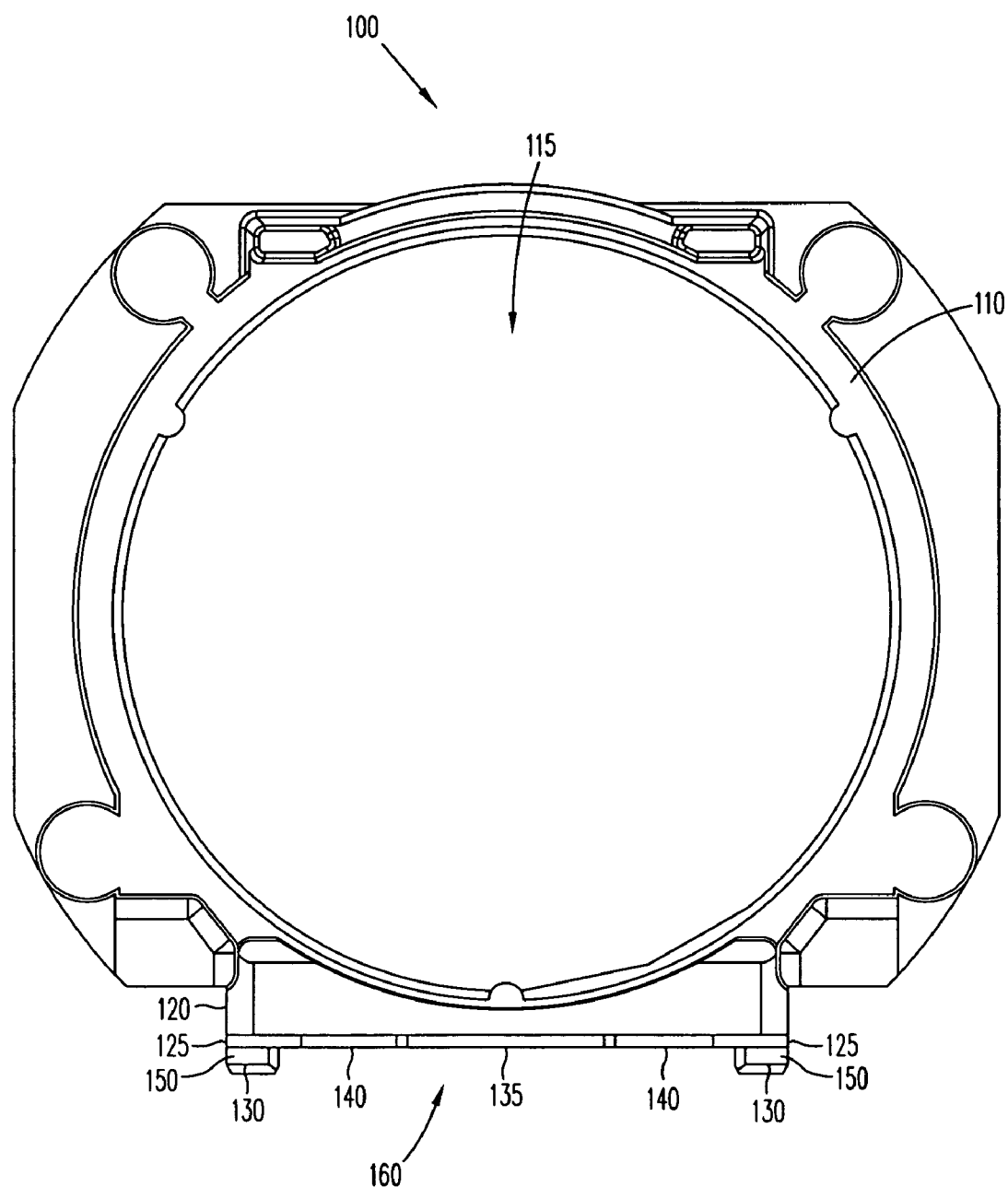
FIG. 3 illustrates a front view of a lens mount in accordance with an embodiment of the present invention.
Figure 4:
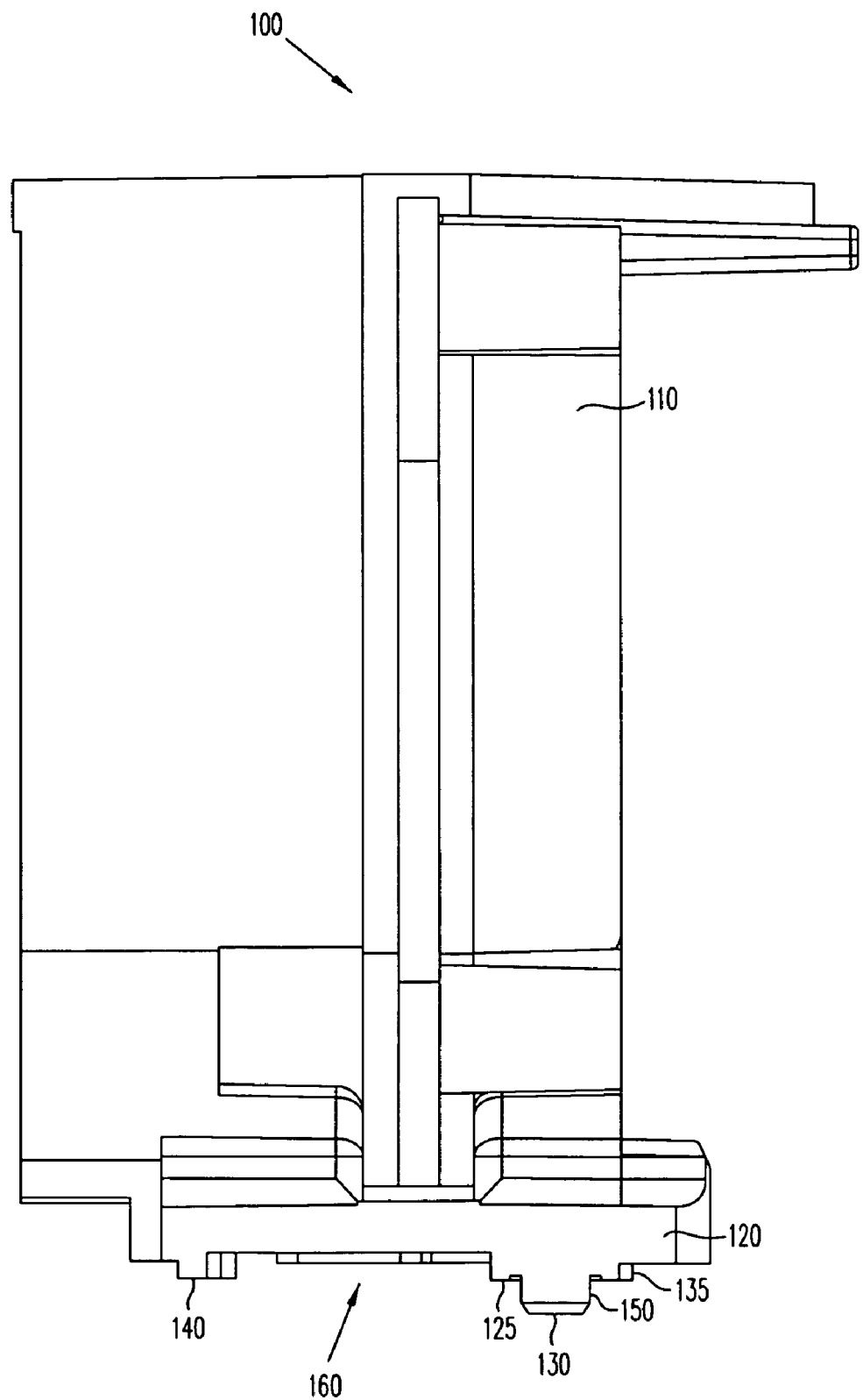
FIG. 4 illustrates a side view of a lens mount in accordance with an embodiment of the present invention.

FIGS. 3 and 4 illustrate front and side views, respectively, of lens mount 100 in accordance with an embodiment of the present invention. It will be appreciated that various components of lens mount 100 previously described herein with regard to FIGS. 1 and 2 are also visible in the illustrations of FIGS. 3 and 4. In particular, left and right mounting pads 125, front mounting pad 135, and rear mounting pad 140 can be seen as being coplanar in FIGS. 3 and 4.

Figure 5:
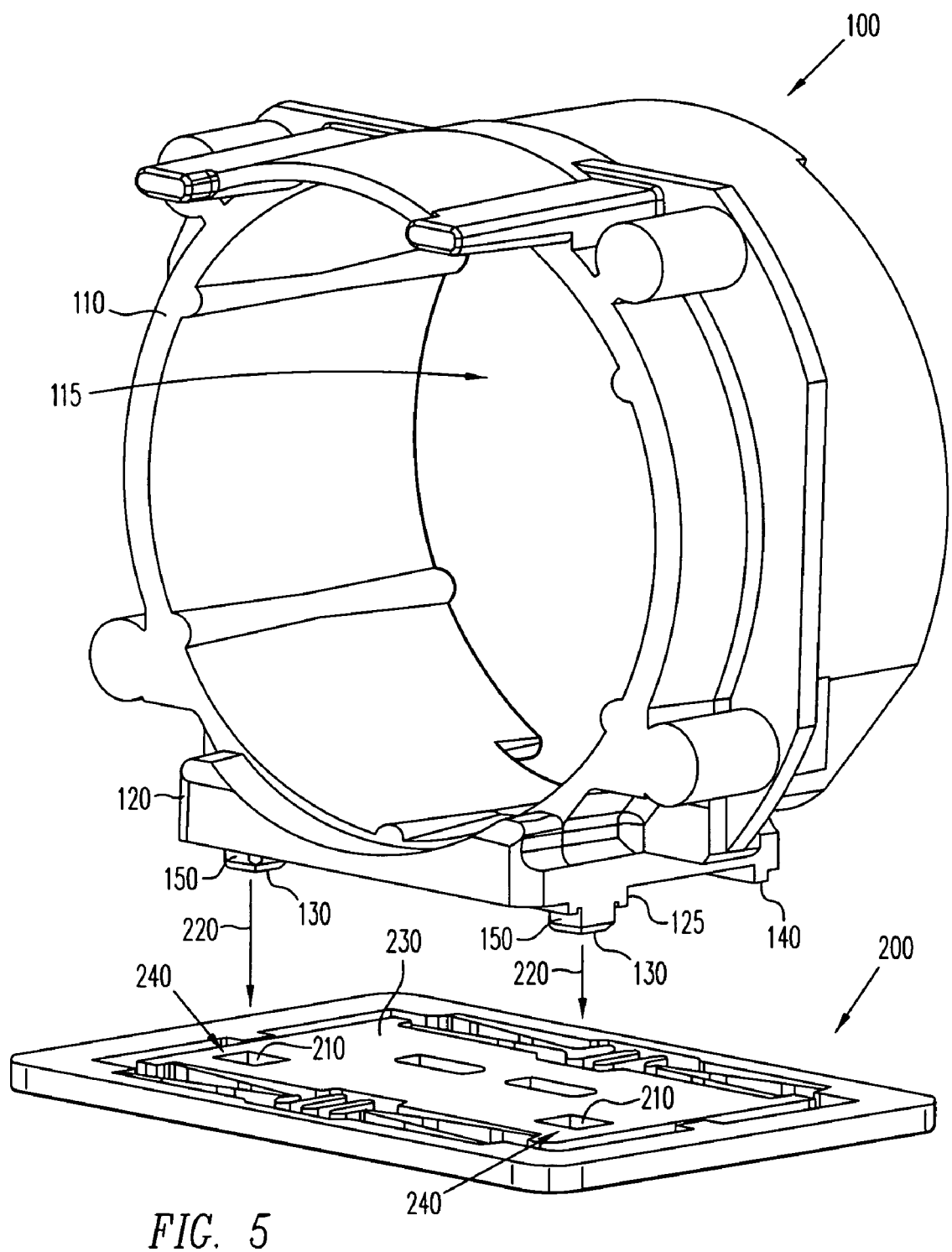
FIG. 5 illustrates a perspective view of a lens mount and a stage in accordance with an embodiment of the present invention.
Figure 6:
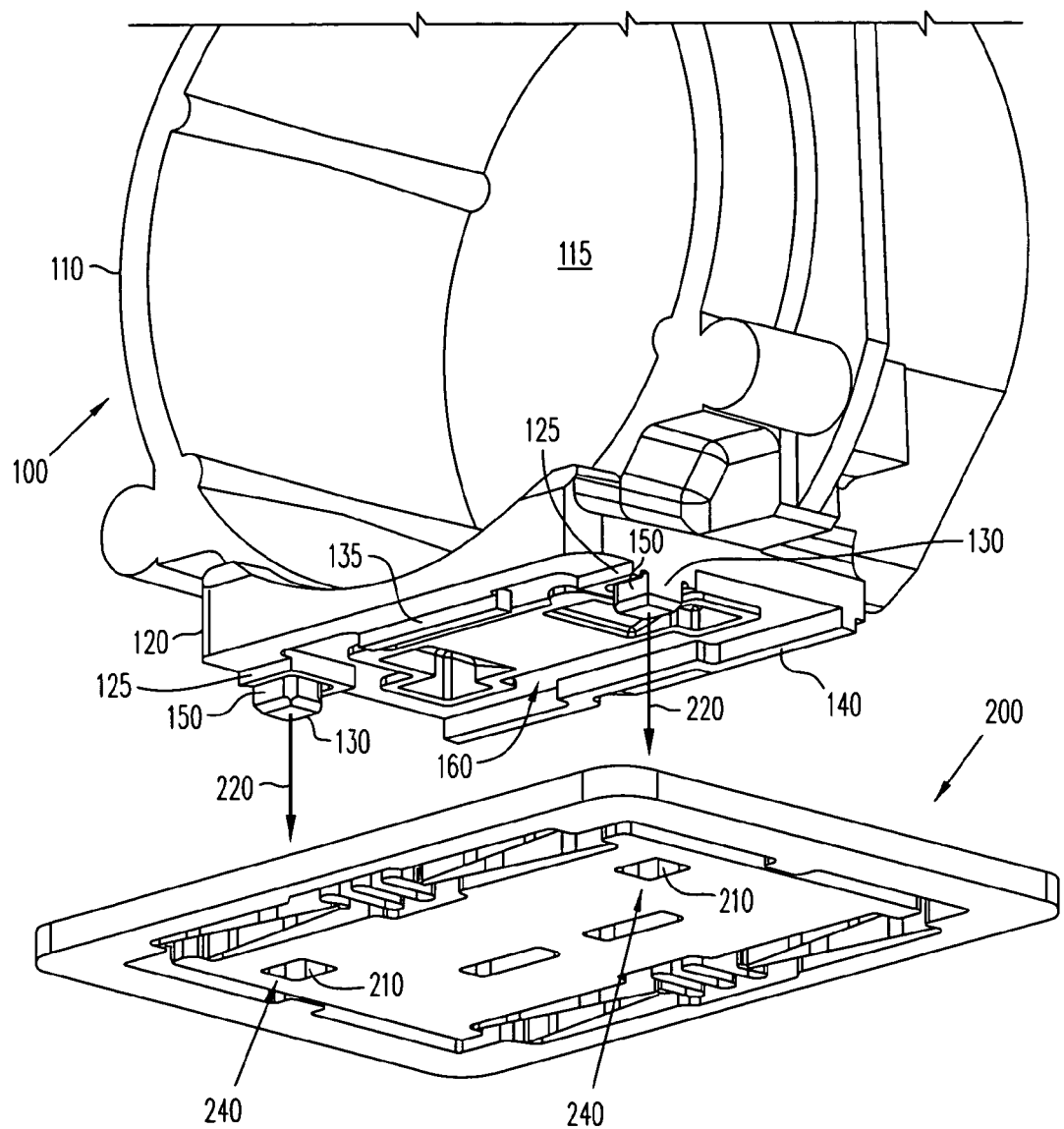
FIG. 6 illustrates another perspective view of a lens mount and a stage in accordance with an embodiment of the present invention.

FIGS. 5 and 6 illustrate perspective views of lens mount 100 and stage 200 in accordance with an embodiment of the present invention. Stage 200 may be implemented as a fixed or movable stage. In embodiments where stage 200 is a movable stage, it may be engaged with an actuator 350 (see FIG. 7) configured to translate stage 200 in a plurality of directions, such as toward and away from an imager 300 (see FIG. 7) of a digital camera (for example, in the direction of arrow 250 of FIG. 7 and/or opposite to the direction of arrow 250). Actuator 350 may be implemented in accordance with any appropriate mechanism for providing controlled movements on a scale appropriate for stage 200. For example, in various embodiments, actuator 350 can be implemented as a Lorentz motor, a micro-electro-mechanical systems (MEMS) device, or other appropriate apparatus.

Lens mount 100 and/or stage 200 can be made from any appropriate material such as plastic, silicon, and/or other materials as may be appropriate for particular applications. In one embodiment, the tolerances of components of lens mount 100 and stage 200 can be in the range of approximately zero to approximately 25 microns.

Stage 200 includes a top surface 230 adapted to receive mounting pads 125, 135, and 140 of base member 120. Stage 200 further includes a plurality of apertures 210 adapted to receive alignment members 130 of base member 120. Front interior surfaces 240 of each of apertures 210 can be implemented as alignment surfaces that are substantially parallel to each other. Front interior surfaces 240 can correspond to alignment surfaces 150 of alignment members 130 in order to aid in the alignment of lens mount 100 with stage 200, as further described herein.

Figure 7:
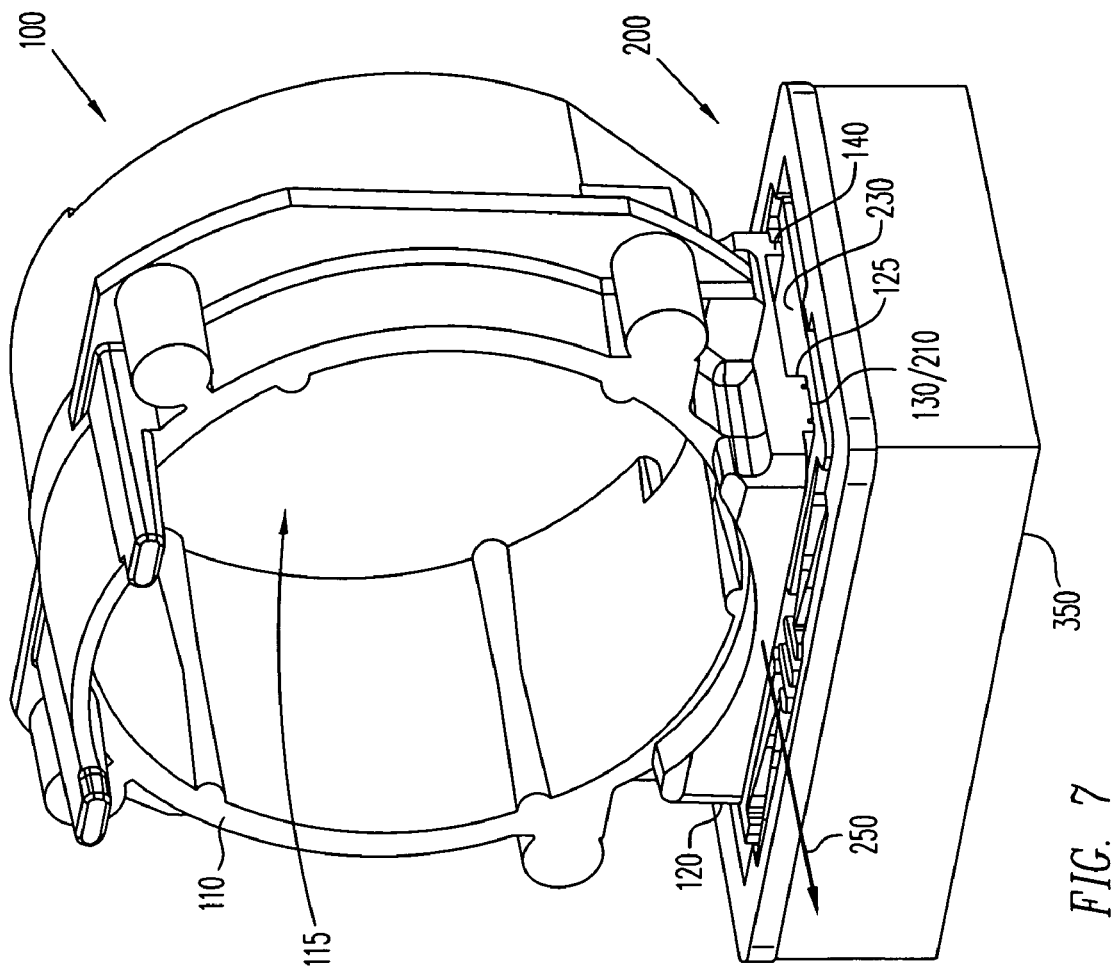
FIG. 7 illustrates a perspective view of a lens mount engaged with a stage in accordance with an embodiment of the present invention.
Figure 7:
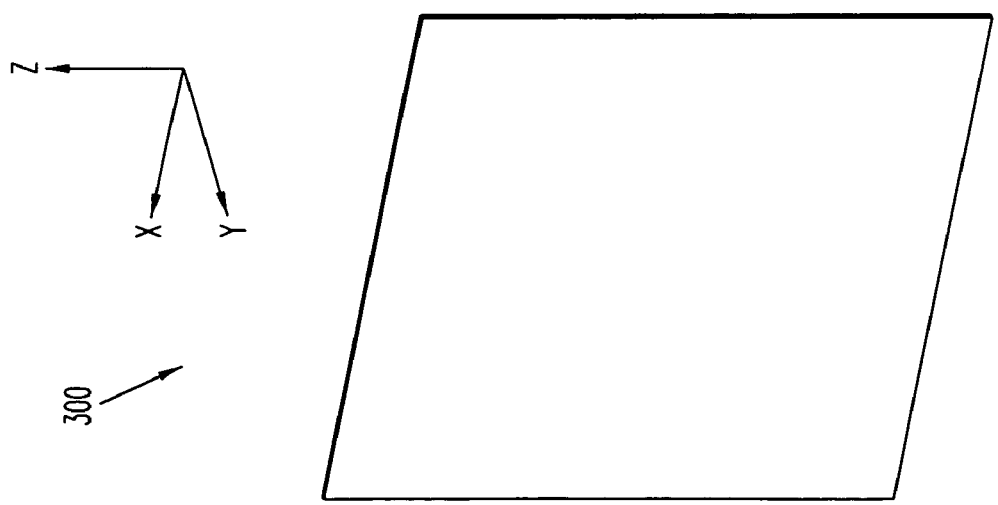

Lens mount 100 may be aligned relative to stage 200 in accordance with several operations as further described herein and illustrated in FIGS. 5-7. Alignment members 130 of lens mount 100 can initially be aligned with corresponding apertures 210 of stage 200.

As illustrated in FIGS. 5 and 6, lens mount 110 can then be lowered onto stage 200 in the direction of arrows 220. To aid in the alignment of lens mount 110, alignment members 130 can be inserted into apertures 210. It will also be appreciated, however, that stage 200 may alternatively be raised toward lens mount 100 in the direction opposite to arrows 220 while lens mount 110 remains stationary.

As lens mount 110 and stage 200 are brought into proximity with each other, alignment members 130 are inserted into apertures 210. Thereafter, mounting pads 125, 135, and 140 and top surface 230 are brought into contact with each other. In order to permanently or semi-permanently affix lens mount 100 to stage 200, an adhesive may be introduced to bottom surface 160 of base member 120 and/or to top surface 230 of stage 200 at any desired time prior to the contacting of mounting pads 125, 135, and 140 with top surface 230.

FIG. 7 illustrates a perspective view of lens mount 100 engaged with stage 200 in accordance with an embodiment of the present invention. It will be appreciated that lens mount 100 and stage 200 can be engaged in the manner illustrated in FIG. 7 after lens mount 100 and stage 200 have been brought into contact with each other, such as by lowering lens mount 100 onto stage 200 in the direction of arrows 220 as illustrated in FIGS. 5 and 6. In FIG. 7, mounting pads 125, 135, and 140 of base member 120 are illustrated as having been brought in contact with top surface 230 of stage 200. In addition, alignment members 130 are illustrated as having been inserted into apertures 210 of stage 200.

As previously discussed, mounting pads 125, 135, and 140 can be coplanar. Accordingly, it will be appreciated that when mounting pads 125, 135, and 140 are brought into contact with top surface 230 of stage 200, lens mount 100 will be fixed relative to stage 200 with regard to at least two rotational degrees of freedom. Specifically, the mounting of coplanar mounting pads 125, 135, and 140 can prevent lens mount 100 from rotating about the X axis (pitch) and Y axis (roll) as illustrated in FIG. 7.

Following the insertion of alignment members 130 into apertures 210 and the contacting of mounting pads 125, 135, and 140 of base member 120 with top surface 230 of stage 200, lens mount 100 may be further aligned with respect to stage 200 by moving lens mount 100 in the direction of arrow 250. As previously discussed, alignment surfaces 150 can be provided on the front members of alignment members 130, and corresponding front interior surfaces 240 can be provided in the interior of apertures 210. When lens mount 100 is moved in the direction of arrow 250, alignment surfaces 150 can be brought in contact with front interior surfaces 240. Lens mount 100 can be moved in the direction of arrow 250 until both alignment surfaces 150 of base member 120 contact the respective front interior surfaces 240 of apertures 210. Each of alignment surfaces 150 and front interior surfaces 240 can be implemented to be substantially perpendicular to the axis of ring member 110. Accordingly, following such contact, front interior surfaces 240 will be substantially parallel to alignment surfaces 150.

It will be appreciated that upon the alignment of alignment surfaces 150 of lens mount 100 with corresponding front interior surfaces 240 of apertures 210, lens mount 100 can be prevented from rotating about the Z axis (yaw) as illustrated in FIG. 7. As a result, following the insertion of alignment members 130 into apertures 210, the contacting of mounting pads 125, 135, and 140 of base member 120 with top surface 230 of stage 200, and the moving of lens mount 100 in the direction of arrow 250, lens mount 100 may be fixed relative to stage 200 such that three degrees of rotational freedom, namely pitch, roll, and yaw, can be resolved to high accuracy. Accordingly, the rotational degrees of freedom of lens mount 100 (as well as any lenses or a lens barrel held by lens mount 100) can be fixed relative to an imager 300 of a digital camera. As a result, by aligning stage 200 such that front interior surfaces 240 of apertures 210 are substantially parallel with imager 300, lens mount 100 and any lenses or lens barrel held by lens mount 100 will also be aligned with imager 300.

Figure 8:
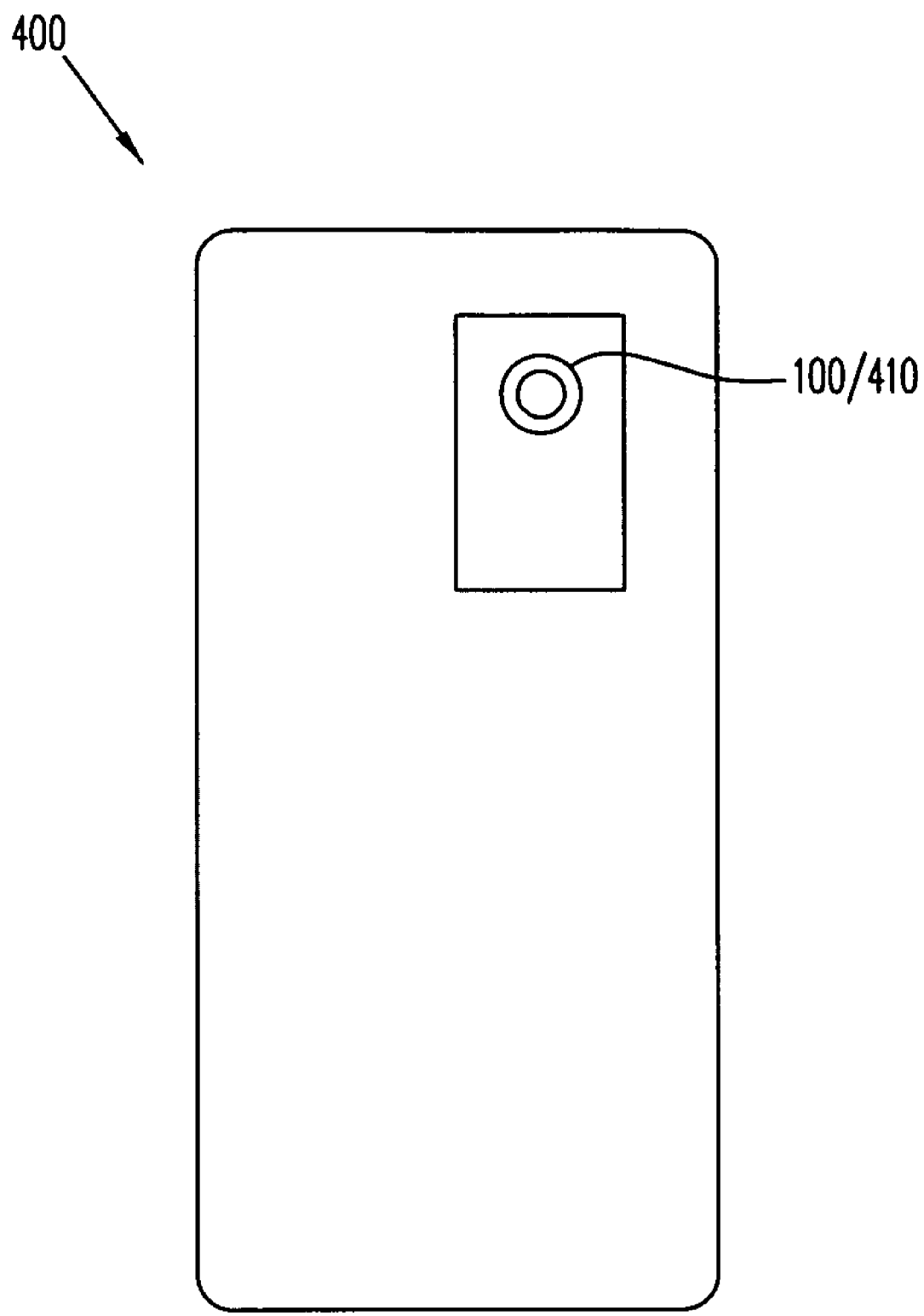
FIG. 8 illustrates a personal electronic device incorporating a lens mount, stage, imager, and actuator in accordance with an embodiment of the present invention.

It will be appreciated that lens mount 100, stage 200, imager 300, and actuator 350 may be implemented as part of a camera in various types of personal electronic devices, such as a digital camera, portable computer, a laptop computer, a notebook computer, a pocket personal computer (pocket PC), a personal digital assistant (PDA), a mobile telephone, or any other appropriate personal electronic device. FIG. 8 illustrates a top view of one such personal electronic device 400. As illustrated in the embodiment set forth in FIG. 8, personal electronic device 400 may include a lens and/or lens barrel 410 held by lens mount 100.

Where applicable, the various components set forth herein can be combined with each other and/or separated into sub-components without departing from the spirit of the present disclosure.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

What is claimed is:

1. A lens mount comprising:
    a ring member;
    a base member having a top surface and a bottom surface, wherein the top surface is connected with the ring member; and
    first and second mounting pads on the bottom surface of the base member, wherein the first and second mounting pads are coplanar.

2. The lens mount of claim 1, further comprising first and second alignment members on the first and second mounting pads.

3. The lens mount of claim 2, further comprising a third mounting pad on the bottom surface of the base member, wherein the first, second, and third mounting pads are coplanar.

4. The lens mount of claim 3, further comprising a fourth mounting pad on the bottom surface of the base member, wherein the first, second, third, and fourth mounting pads are coplanar.

5. The lens mount of claim 2, wherein the base member further comprises first and second alignment surfaces substantially perpendicular to the axis of the ring member.

6. The lens mount of claim 5, wherein the alignment surfaces are surfaces of the first and second alignment members.

7. The lens mount of claim 1, further comprising a plurality of threads on an interior surface of the ring member.

8. The lens mount of claim 1, wherein the ring member and base member are a unitary body.

9. The lens mount of claim 1, wherein the lens mount is part of a personal electronic device.

10. An apparatus adapted to position a lens, the apparatus comprising:
    a lens mount comprising:
        a ring member,
        a base member having a top surface and a bottom surface, wherein the top surface is connected with the ring member,
        first, second, and third mounting pads on the bottom surface of the base member, wherein the mounting pads are coplanar, and
        first and second alignment members on the first and second mounting pads; and
    a stage comprising:
        a top surface adapted to receive the first, second, and third mounting pads, and first and second apertures adapted to receive the alignment members.

11. The apparatus of claim 10, further comprising adhesive adapted to affix the bottom surface of the base member with the top surface of the stage.

12. The apparatus of claim 10, wherein the lens mount further comprises first and second alignment surfaces substantially perpendicular to the axis of the ring member.

13. The apparatus of claim 12, wherein the first and second alignment surfaces of the lens mount are surfaces of the first and second alignment members, respectively.

14. The apparatus of claim 13, wherein the stage comprises first and second alignment surfaces substantially parallel to the first and second alignment surfaces of the lens mount.

15. The apparatus of claim 14, wherein the first and second alignment surfaces of the stage are interior surfaces of the stage defining the first and second apertures, respectively.

16. The apparatus of claim 10, wherein the lens mount further comprises a plurality of threads on an interior surface of the ring member.

17. The apparatus of claim 10, wherein the ring member and base member are a unitary body.

18. The apparatus of claim 10, wherein the base member is substantially rectangular, wherein the first mounting pad is positioned adjacent to a first side of the base member, wherein the second mounting pad is positioned adjacent to a second side of the base member opposite to the first side, and wherein the third mounting pad is positioned adjacent to a third side of the base member.

19. The apparatus of claim 10, wherein the stage is made of silicon.

20. The apparatus of claim 10, wherein the apparatus is part of a personal electronic device.

21. A personal electronic device comprising:
a lens mount comprising:
    a ring member adapted to receive a lens barrel,
    a base member having a top surface and a bottom surface, wherein the top surface is connected with the ring member,
    first, second, and third mounting pads on the bottom surface of the base member, wherein the mounting pads are coplanar,
    first and second alignment members on the first and second mounting pads, and
    first and second alignment surface on the first and second alignment members, respectively, wherein the first and second alignment surfaces are substantially perpendicular to the axis of the ring member;
a stage comprising:
a top surface adapted to receive the first, second, and third mounting pads,
first and second apertures adapted to receive the alignment members, and
first and second interior surfaces of the stage defining the first and second apertures, respectively, wherein the first and second interior surfaces are substantially parallel to the first and second alignment surfaces of the lens mount, respectively; and
an actuator engaged with the stage and adapted to translate the stage in a plurality of directions.

22. The personal electronic device of claim 21, wherein the personal electronic device is a digital camera.

23. The personal electronic device of claim 21, wherein the actuator is a micro-electro-mechanical systems (MEMS) device.

24. A method of aligning a lens mount relative to a stage, the method comprising:
providing a lens mount comprising:
    a ring member, and
    a base member having a top surface and a bottom surface, wherein the top surface is connected with the ring member,
providing a stage having a top surface;
aligning a plurality of alignment members on a bottom surface of the base member with a corresponding plurality of apertures in the stage;
inserting the alignment members into the apertures; and
contacting first, second, and third mounting pads on the bottom surface of the base member with the top surface of the stage.

25. The method of claim 24, further comprising moving the lens mount in a first direction until first and second alignment surfaces of the base member contact first and second alignment surfaces of the stage.

26. The method of claim 25, wherein the first and second alignment surfaces of the base member are surfaces of the alignment members.

27. The method of claim 26, wherein the fast and second alignment surfaces of the stage are interior surfaces of the apertures in the stage.

28. The method of claim 24, further comprising introducing an adhesive between the top surface of the stage and the bottom surface of the base member prior to the contacting operation.

29. The method of claim 24, further comprising introducing an adhesive between the top surface of the stage and the bottom surface of the base member after the contacting operation.

* * * * *